US008240243B2

(12) United States Patent
Gaus et al.

(10) Patent No.: US 8,240,243 B2
(45) Date of Patent: Aug. 14, 2012

(54) FLUID POWER LINEAR DRIVE

(75) Inventors: Alexander Gaus, Denkendorf (DE); Gerald Muller, Stuttgart (DE)

(73) Assignee: Festo AG & Co. KG, Esslingen (DE)

( * ) Notice: Subject to any disclaimer, the term of this patent is extended or adjusted under 35 U.S.C. 154(b) by 885 days.

(21) Appl. No.: 12/309,238

(22) PCT Filed: Jul. 19, 2007

(86) PCT No.: PCT/EP2007/006399

§ 371 (c)(1),
(2), (4) Date: Jan. 9, 2009

(87) PCT Pub. No.: WO2009/010083

PCT Pub. Date: Jan. 22, 2009

(65) Prior Publication Data

US 2009/0288553 A1 Nov. 26, 2009

(51) Int. Cl.
*F15B 15/14* (2006.01)
*F16J 10/00* (2006.01)

(52) U.S. Cl. ........................................... 92/164; 91/394

(58) Field of Classification Search .................... 92/163, 92/164; 91/394, 404
See application file for complete search history.

(56) References Cited

U.S. PATENT DOCUMENTS 3,850,080 A * 11/1974 Ekstrom ........................ 91/395
4,167,134 A * 9/1979 Yuda ............................... 91/405

FOREIGN PATENT DOCUMENTS

| | | |
|---|---|---|
| DE | 2414787 | 10/1974 |
| DE | 3807889 | 9/1989 |
| EP | 0875679 | 11/1998 |
| EP | 1322867 | 11/2005 |
| FR | 2622672 | 5/1989 |
| JP | 07269514 | 10/1995 |

* cited by examiner

*Primary Examiner* — Thomas E Lazo
(74) *Attorney, Agent, or Firm* — Hoffmann & Baron, LLP

(57) ABSTRACT

A fluid operated linear drive in which on the outer periphery of a centering portion (24) fitting in a housing tube (4) at least one housing cover (5) has an annular groove (28) accommodating an annular seal (32). The outer flank (36), which is on the side of the housing tube (3), of the annular groove (28) is a component of cap part (42), which is coaxially mounted on the centering portion (24) and fixed on the housing cover (5). This division into two parts facilitates production of a flash-free annular groove (28) without fettling.

21 Claims, 8 Drawing Sheets

FLUID POWER LINEAR DRIVE

This application claims priority based on an International Application filed under the Patent Cooperation Treaty, PCT/EP2007/006399, filed Jul. 19, 2007.

BACKGROUND OF THE INVENTION

The invention relates to a fluid power linear drive comprising a drive housing having a housing tube and terminating walls arranged terminally thereon, at least one terminating wall being in the form of a housing cover separate from the housing tube having a centering portion fitting into the housing tube, said centering portion having on its outer periphery an annular groove with two axially opposite flanks and in such annular groove at least one annular seal is received for cooperation with the inner face of the housing tube fitted over it.

A known fluid power linear drive of this type is disclosed in the introductory part of the German patent publication DE 3807889 A1. Here it is a question of a power cylinder whose drive housing comprises a housing tube closed by two housing covers, the housing covers respectively having a centering portion fitting into the housing tube. For producing a seal between the housing cover and the housing tube an annular groove is machined in the outer periphery of the centering portion, to accommodate a sealing ring for cooperation with the inner face of the housing tube.

Since the production of the annular groove by machining is extremely complex the said German patent publication DE 3807889 A1 also proposed instead of having the sealing ring in an annular groove in the outer periphery of the centering portion placing it in an axial annular recess in an axially orientated terminal face of the housing cover. Such a recess may be produced as part of shaping by casting the housing cover without the need for later mechanical working without cutting. However this system is only suitable for drive housings whose housing tube has a relatively thick wall and in the case of which the housing tube is braced firmly against the housing cover axially. In conjunction with a thin-walled housing tube and even more so when the tube is to be joined radially with the inserted centering portion by a crimped joint, this type of seal is not suitable.

SUMMARY OF THE INVENTION

One object of the present invention is to suggest measures for a simpler radial seal betwixt a housing cover and the housing tube of a linear drive.

In connection with the initially mentioned features this aim is achieved because the outer axial groove flank, arranged on the side of the housing tube, of the annular groove is formed by a terminal face of a cap part mounted from the side of the housing tube coaxially on the centering portion and secured on the housing cover.

Unlike the prior art in this case the two axially orientated groove flanks are no longer an integral component of the centering portion. The outer groove flank, which is axially nearer to the other terminal wall, of the annular groove is now a component of a cap part, which is separate from the housing cover, which is mounted on the centering portion, more particularly by plugging, to complete the annular groove. The axially opposite inner groove flank like the floor of the annular groove as well may still be made integrally on the housing cover and furthermore owing to the absence of an outer groove flank production by injection molding without machining is possible, something which in connection with an axial demolding offers a possibility of producing the faces of the annular groove without burr and accordingly any need to fettle by machining. Owing to the following mounting of the cap part the annular groove, which is open radially outward, is completed, preferably after the at least one annular seal has been pushed into place on the centering portion.

Advantageous developments of the invention are defined in the dependent claims.

In principle it would be possible to so mold the cap part that a central part thereof fits into a recess in the housing cover with a wall, which extends exclusively radially, extends outward in order to delimit the annular groove on the outer axial side. However most preferably a design is employed, in which the cap part possesses a cylindrical axial side wall which fits over the centering portion of the housing cover in a radially outward direction and whose terminal face constitutes the outer groove flank.

The peripheral wall is preferably adjoined by a floor wall, placed axially in front of the centering portion, of the cap part, such wall portion preferably contacting the above mentioned terminal face of the centering portion. It is then more particularly possible to design the terminal face of the cap part, extending away from the centering portion, as a buffer face for a drive piston linearly sliding in the interior of the drive housing. Accordingly a direct impact of the drive piston on the housing cover may be avoided.

More particularly when the cap part is to be secured by a detent catch on the housing cover, it is best to provide a segmented structure of the peripheral wall. In this case it is then possible for one or more of the wall segments defined by the segmentation to be designed so as to be elastically flexible in the radial direction and to bear detent means, which are able to be brought into engagement with complementary detent means of the housing cover.

For example at least one and preferably several wall segments may have a radially inwardly directed detent projection, which for locking the cap part can fit into a detent recess formed on the outer periphery of the centering portion. When the detent recess only extends over part of the periphery of the centering portion, it is then possible to produce a rotary lock between the cap part and the housing cover.

The floor wall of the cap part may be axially perforated in the central region. Accordingly it is for example possible to allow the passage of fluid for input and outlet of the fluid pressure medium employed for operation of the linear drive. Furthermore a piston rod may extend through, if the linear drive is a fluid operated power cylinder having a piston rod.

A particularly firm support for the cap part is possible, if the cap part has a sleeve-like axial extension extending into a recess, which is open toward the terminal face of the housing cover and bears radially against its inner peripheral face, in the housing cover. This is more particularly advantageous in conjunction with the above mentioned functionality as a buffering face for a drive piston.

The radial support is however also particularly advantageous when the sleeve-like axial extension functions as a plain bearing for the piston rod, extending coaxially through it, of the linear drive. The transverse forces transmitted by the piston rod to the plain bearing are accordingly directly passed on radially into the housing cover without a pivoting force affecting the floor face and acting on the outer axial groove flank of the annular groove.

As a plain bearing it is more particularly possible to resort to an annular portion (axially spaced from the floor wall) of the sleeve-like axial extension, which is joined with the floor wall by several axially extending connecting ribs, which are spaced apart in the peripheral direction of the axial extension.

Accordingly the bearing region for the piston rod can be placed directly adjacent to the region of exit from the housing cover and may simultaneously be grouped in an axial length of minimum size. The connecting ribs may provide for a certain degree of yielding, something which simplifies assembly, because it allows for manufacturing inaccuracies. The intermediate spaces between adjacent connecting ribs furthermore lead to a respectable saving in material and if required permit the passage of fluid.

However the European patent publication EP 1322867 B1 has already disclosed the possibility of segmentation of the sleeve-like bearing part of a piston rod in strips, the intermediate spaces here being filled with rubber-like material.

It is furthermore convenient for the annular portion, functioning as a plain bearing, of the sleeve-like axial extension to be divided up by several longitudinal grooves cut into the inner peripheral face to produce several plain bearing faces, spaced apart in the peripheral direction. As it has turned out, such a design has a much improved dimensional accuracy in comparison with a non-segmented bearing face.

As a further function the cap part may furthermore perform a holding action on an annular stripper terminally preceding the sleeve-like axial extension and surrounding any piston rod which may be present in order to strip off dirt from the rod.

The cap part is preferably an integral plastic part, preferably manufacture of a non-reinforced thermoplastic material. In this respect several functions may be performed by the cap part including in addition to the delimitation of the outer flank of the annular groove the formation of a plain bearing and/or a supporting function for an annular leading stripper.

As a material for the housing cover a fiber-reinforced plastic material is preferred and more especially a plastic material with glass fiber reinforcement. In the case of the housing cover as well it is preferably a question of an injection molding.

In one and the same linear drive either only one or preferably both terminal walls, may be molded in the form of housing covers, which are provided with a cap part of the type specified. In this respect it is possible for both cap parts of one and the same linear drive to differ in their geometry. This will apply more particularly when the linear drive is designed as a fluid operated power cylinder and only one of the two terminal walls has a piston rod extending through it.

BRIEF DESCRIPTION OF THE DRAWINGS

Embodiments of the invention will now be described with reference to the accompanying drawings in detail. In the drawings.

DETAILED DESCRIPTION OF THE PREFERRED EMBODIMENTS

Figure 1:
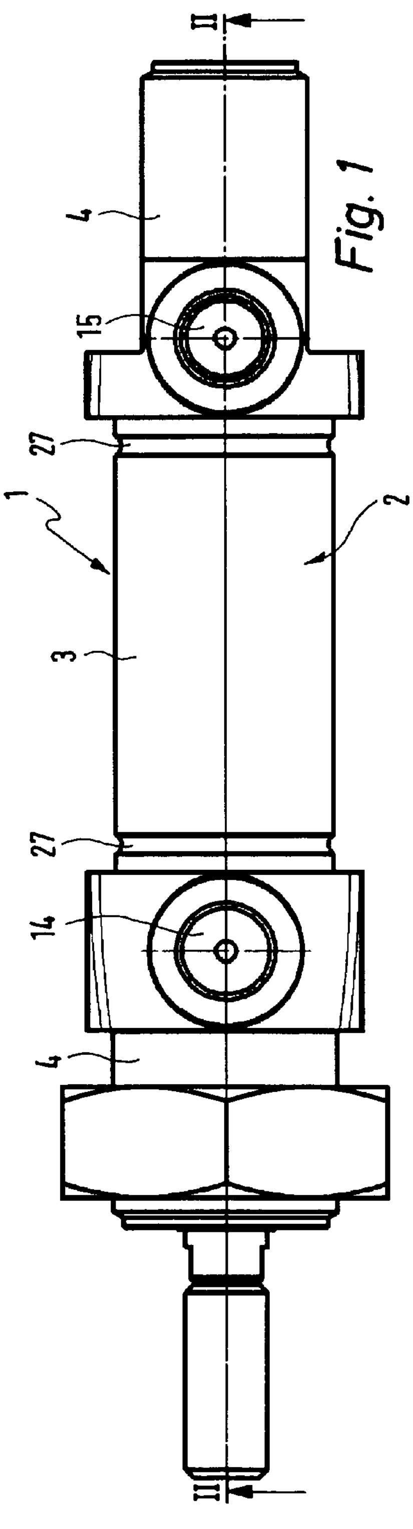
FIG. 1 is a plan view of a preferred design of the fluid power linear drive in accordance with the invention.
Figure 2:
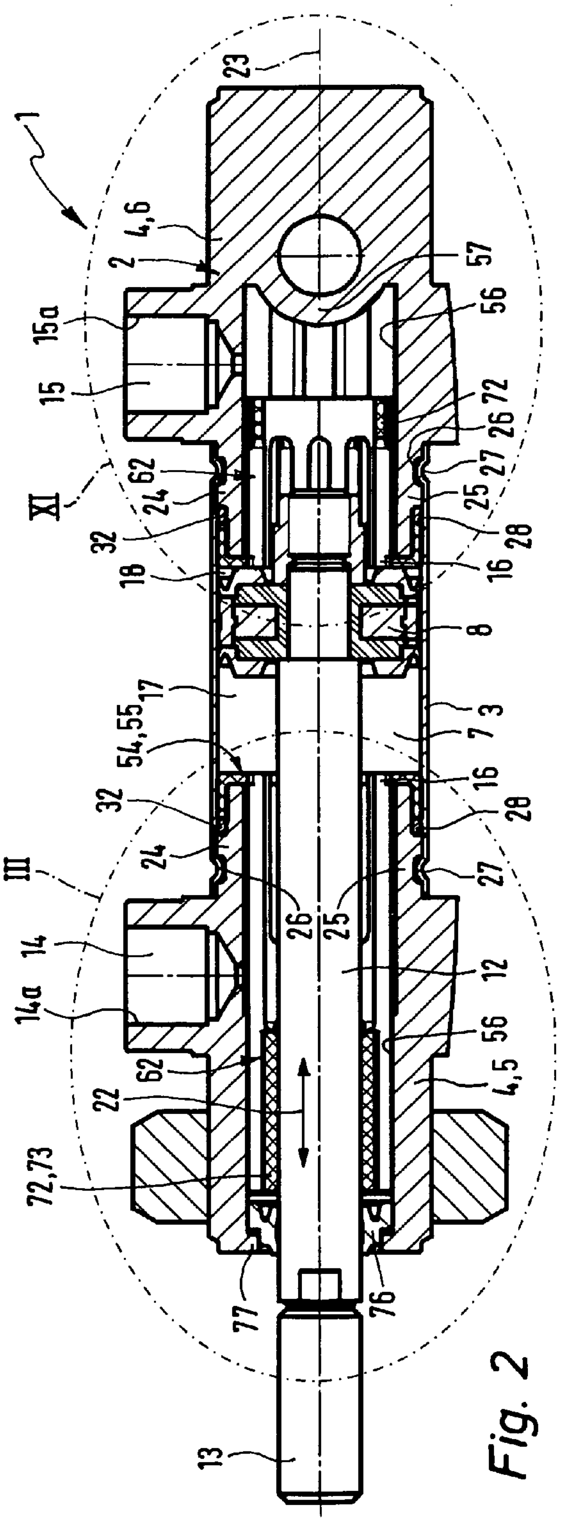
FIG. 2 shows a longitudinal section taken through the linear drive as in FIG. 1 on the section line II-II.
Figure 3:
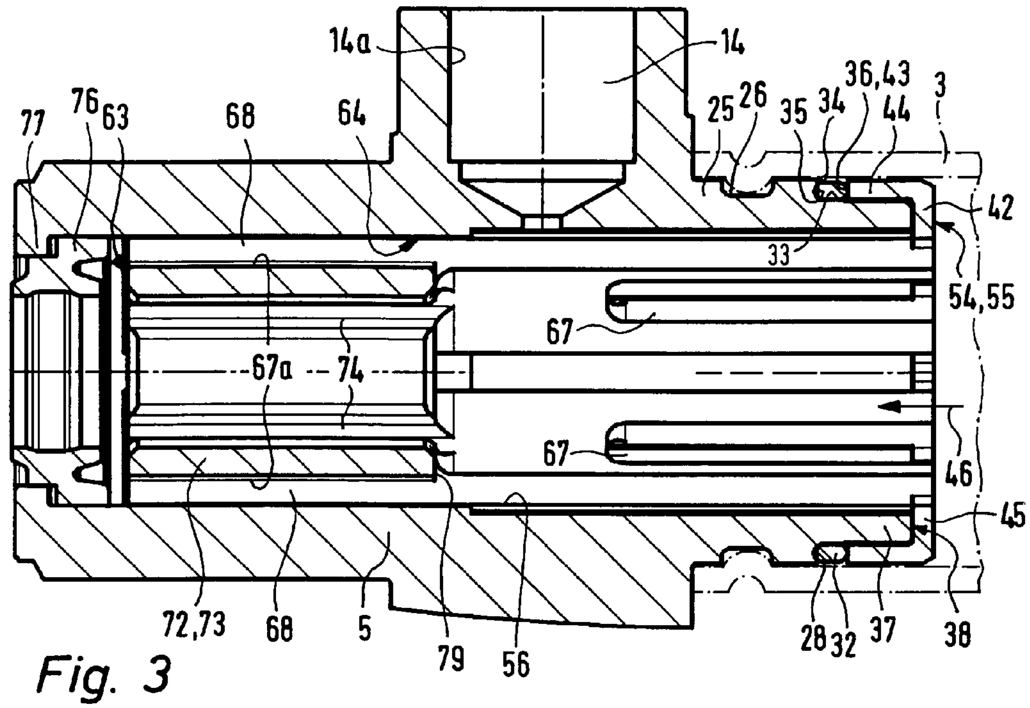
FIG. 3 shows the front housing cover, indicated in the region III in FIG. 2, in a sectioned single representation on the section line III-III in FIG. 8.
Figure 4:
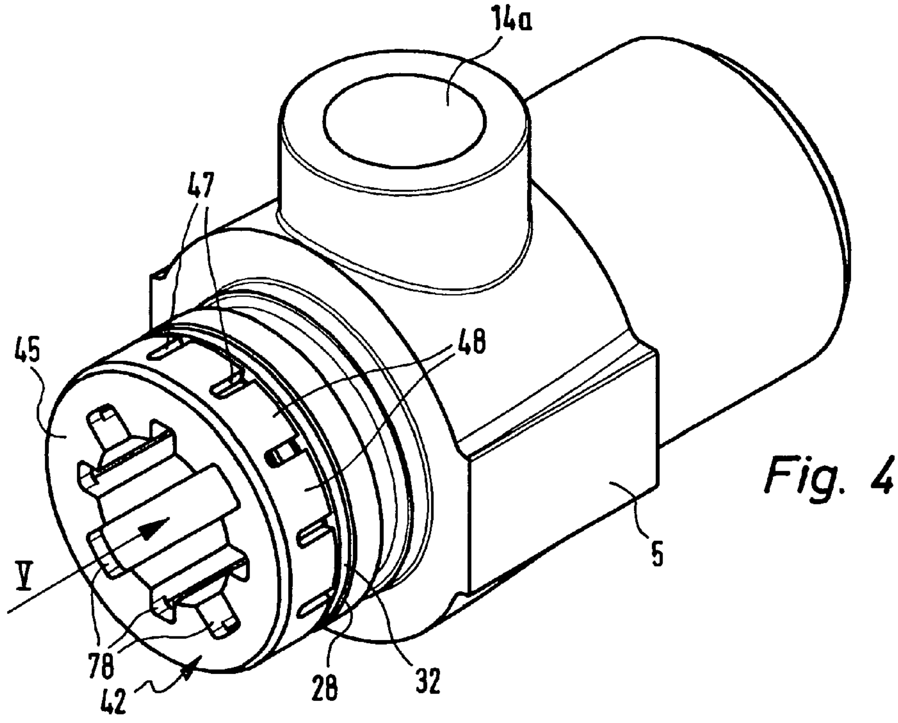
FIG. 4 is a perspective separate representation of the front housing cover looking obliquely toward the rear.
Figure 5:
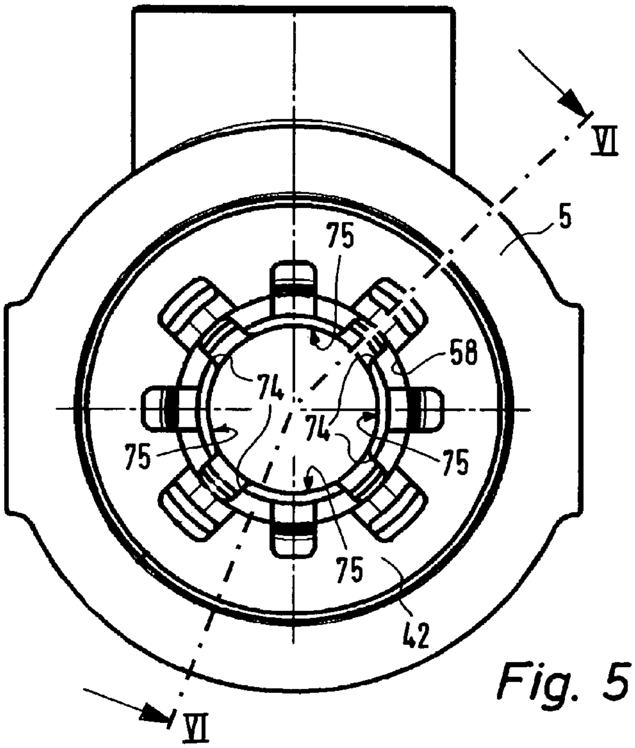
FIG. 5 is a rear view of the front housing cover looking in the direction of the arrow V.
Figure 6:
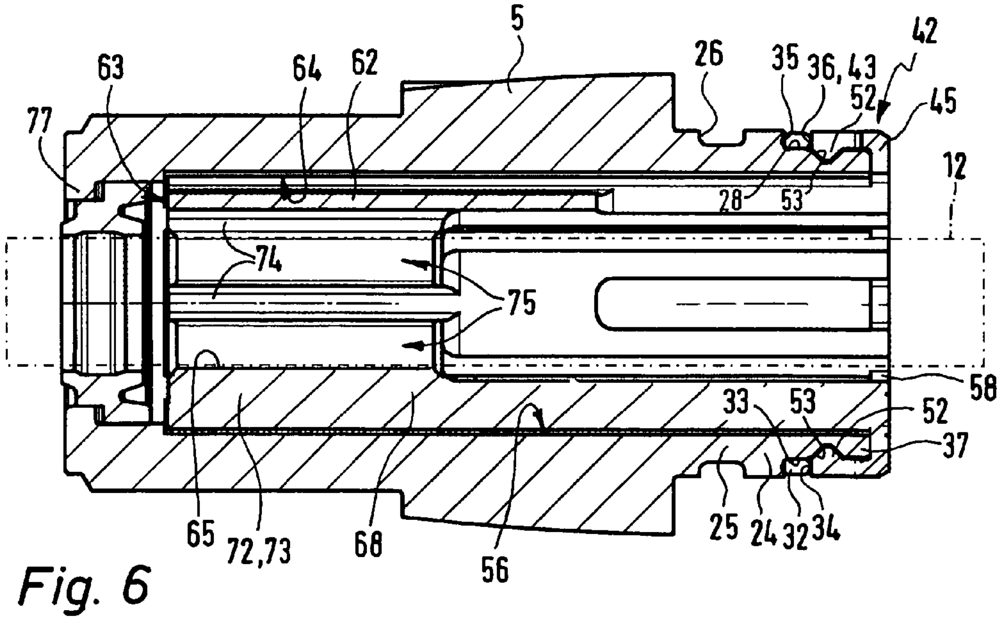
FIG. 6 is a further longitudinal section taken through the front housing cover in a section plane VI-VI differing from the plane in FIG. 3.
Figure 7:
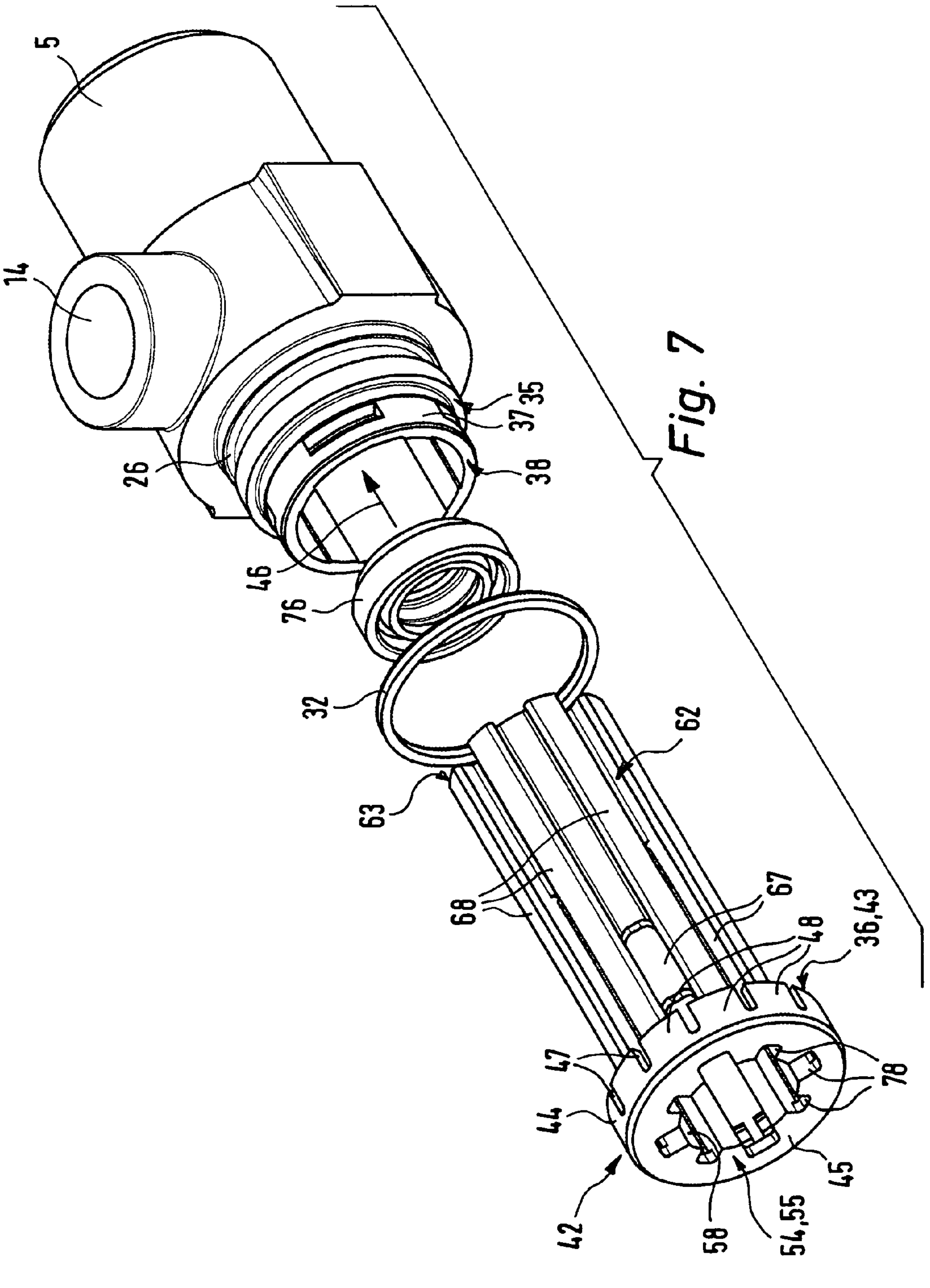
FIGS. 7 and 8 are perspective exploded views of the front housing cover as seen looking in different directions.
Figure 8:
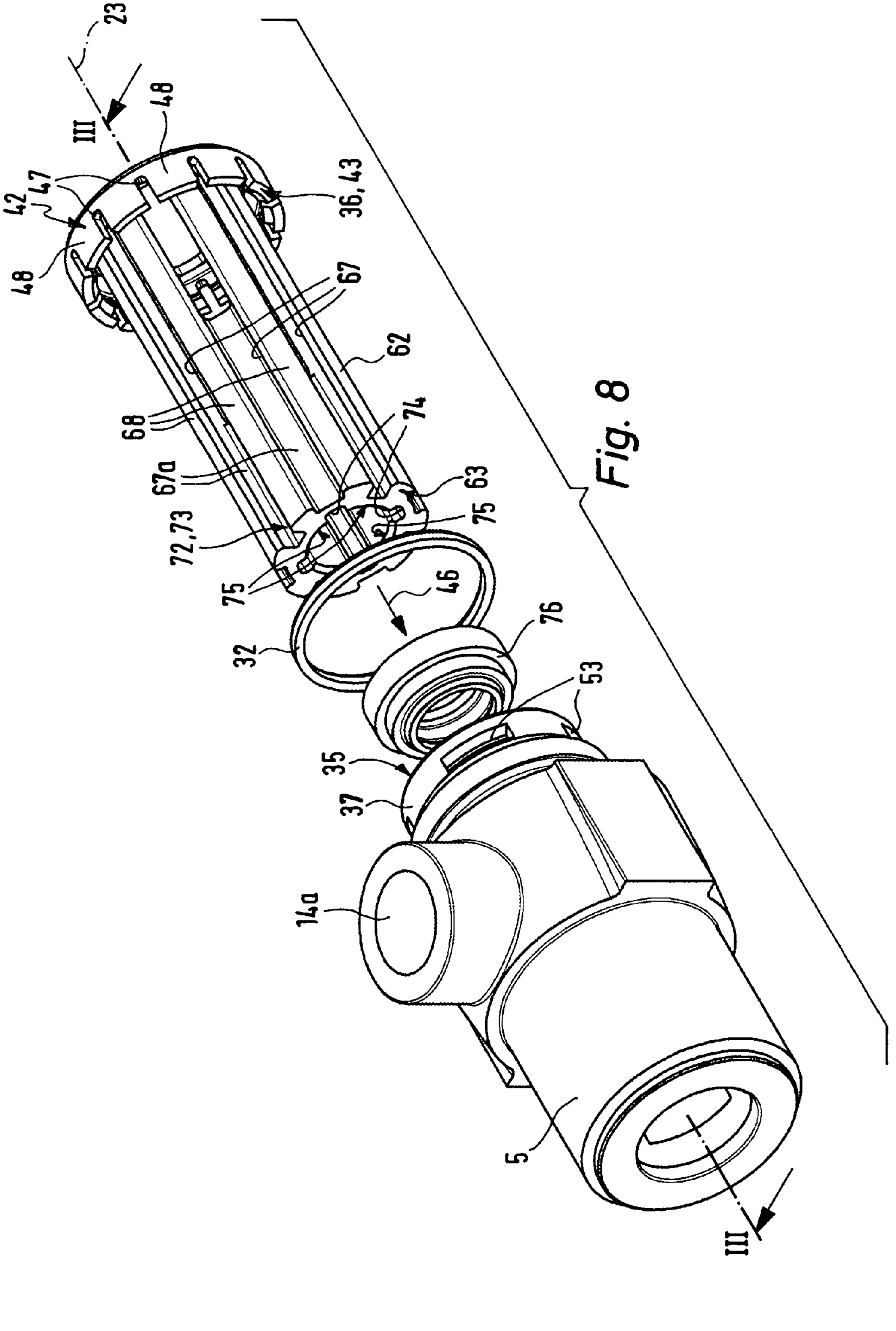
Figure 9:
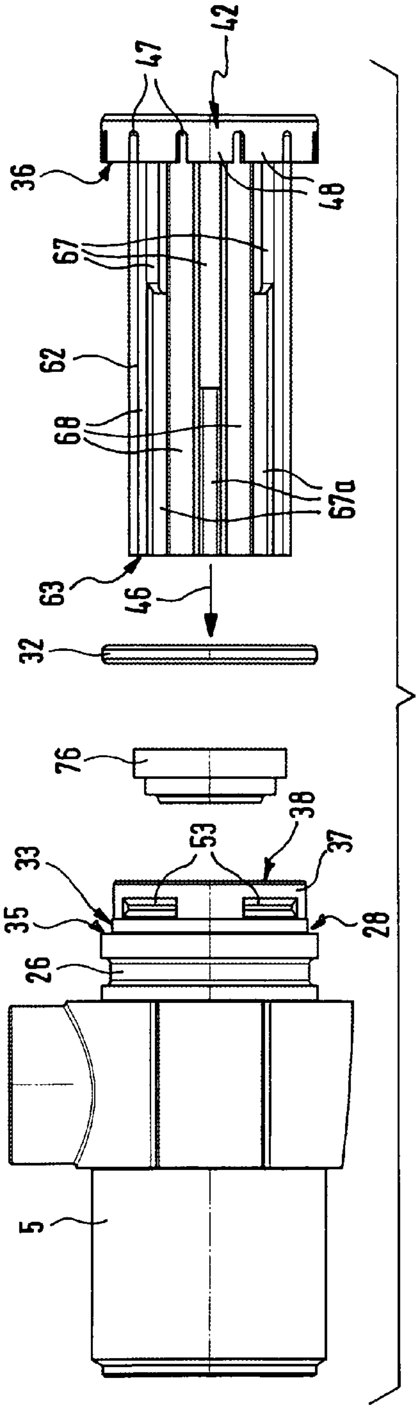
FIG. 9 shows a housing cover in a lateral exploded elevation.
Figure 10:
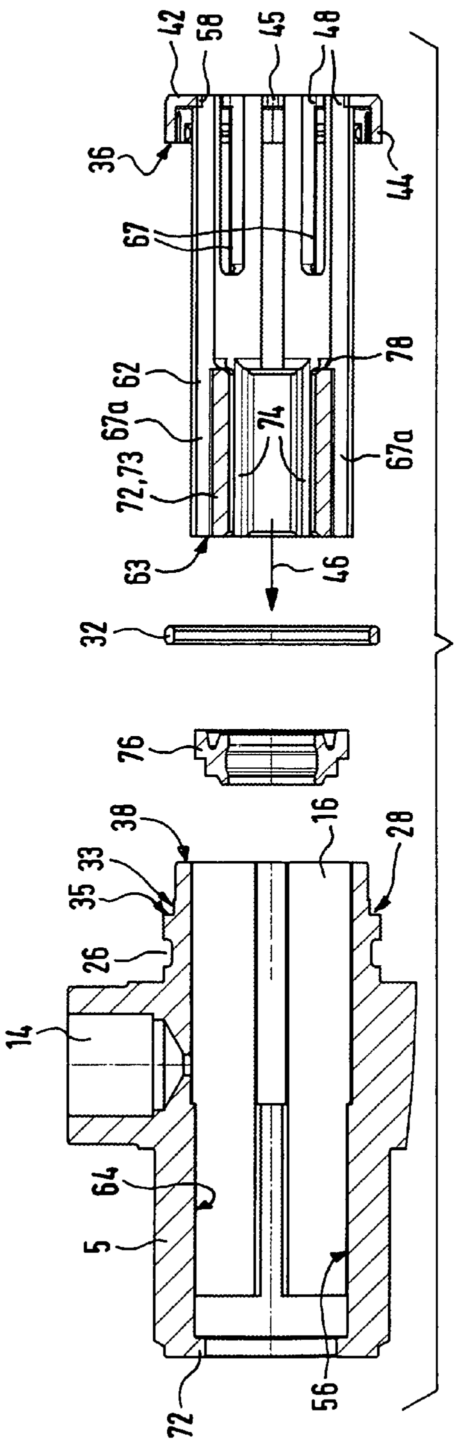
FIG. 10 shows the arrangement of FIG. 9 in a longitudinal section.

The fluid power linear drive 1 depicted in a general view in FIGS. 1 and 2 may be operated with any desired fluid medium and preferably with compressed air. In the working embodiment it is designed in the form of a power cylinder and more especially a pneumatic cylinder.

The linear drive 1 comprises an elongated drive housing 2 with a housing tube 3 preferably of a thin-walled metal and two wear-resistant terminal walls 4 closing the housing tube 3 at its ends. The two end walls 4 are in the working example parts which are separate from the housing tube 3 and in the form of housing covers which for a better distinction are termed the front housing cover 5 and the rear housing cover 6.

It would also be possible to design one of the terminal walls 4 as a component directly integral with the housing tube 3.

The housing tube 3 delimits, together with the two housing covers 5 and 6, an inner space 7, in which a drive piston 8 is accommodated which is driven by fluid force and which makes sealing contact with the bore face of the housing tube 3.

A piston rod 12 is fixedly joined to the drive piston 8 as to extend from its front face and slides through the front housing cover 5 to the outside. On the other terminal portion of the piston rod 12 there is an attachment portion 13 for the mounting of a component to be shifted.

Both housing covers 5 and 6 have a fluid duct 14 and 15 extending through them, which at one end opens at an outer opening region 14*a* and 15*a* at an outer face of the housing cover 5 and 6 respectively, where it renders possible the connection of a fluid line (not illustrated). By way of such line the fluid pressure medium necessary for operation can be supplied and let off.

At its other end each control duct 14 and 15 opens via an inner aperture region 16, which is coaxial to the inner space, into one of two working chambers 17 and 18, into which the inner space 7 is divided by the drive piston 7 axially.

The two working chambers 17 and 18 are able to be subjected to fluid in a known fashion via the associated control ducts 14 and 15 so that the drive piston 8, and with it the piston 12, may be driven to perform a linear working movement 22, indicated by double arrow, in the direction of the longitudinal axis 23 of the drive housing 2.

The two housing covers 5 and 6 are attached according to the same principle on the housing tube 3. Each housing cover 5 and 6 has a centering portion 24 which for part of its length—in the following termed the attachment portion 25—has an outline complementary to the inner periphery of the housing tube 3. This centering portion 24 of the housing cover 5 and 6 is terminally plugged into the housing tube 3. At the outer periphery of the attachment portion 25 the centering portion 24 portion possesses a radially outwardly open attachment groove 26 into which a peripheral portion of the housing tube 3 is rolled with plastic deformation. Accordingly there is a peripherally extending neck 27 in the housing tube 3 and such neck 27 fits into the attachment groove 26 to form an interlocking swaged joint and accordingly there is a firm connection between the housing tube 3 and the associated housing cover 5 and 6.

An annular groove 28 is placed axially in front of the attachment groove 26, and spaced from it, toward the housing tube 3, i.e. toward the respectively other housing cover. The annular groove 28 (containing an annular seal 3) is located on the outer periphery of the centering portion 24 with the groove floor 33 lying radially inward and the groove opening 34 directed radially outward and furthermore with two groove flanks 35 and 36 facing each other axially. The groove flank lying on the side of the housing tube 3, which is accordingly near to the respectively other housing cover will be termed the outer groove flank 36 in the following while the opposite groove flank, which is near the attachment portion 25, is referenced 35.

In the case of the annular seal 32 it is more particularly a question of a plain O-ring. If required more than one annular seal 32 could be arranged in the annular groove 28.

The housing tube 3 slipped over the centering portion 24 fits over and past the annular groove 28 so that the seal 32 is in a position of acting on and making sealing contact with radially inwardly facing inner face of the housing tube 3. Since the seal 32 is then thrust into the annular groove 28 with a press fit there is also a sealing contact with the limiting faces of the annular groove 28, this resulting in a fluid sealing action for the working chamber 17 and 18 adjoining the centering portion 24 in an inward direction preventing communication with the atmosphere.

The linear drive 1 could also possess a piston rod extending right the way through, i.e. through the rear housing cover 6. A design without a piston rod would also be possible, in the case of which neither housing cover 5 and 6 has a piston rod running through it and the transmission of force would take place by magnetic coupling, for example, or through a longitudinal slot in the housing tube 3.

Absent any indication to the contrary in the present account the particulars apply both for the front housing cover 5 and also from the rear housing cover 6.

The limiting faces of the annular groove 28 are not present all on housing covers 5 and 6. Only the inner groove flank 35 and the groove floor 33 are an integral component of the centering portion 24. The centering portion 24 is circularly cylindrical externally and is stepped in the axial direction, the groove floor 33 being constituted by the outer face of a cylindrical terminal portion 37 of the centering portion 24, which runs as far as the axial terminal face 38, adjoining the centering portion 24 and facing the other housing cover, of the respective centering portion 24.

The inner groove flank 35 is constituted by an annular step defining the transition between the cylindrical terminal portion 37 and the above mentioned attachment portion 25. The attachment portion 25 therefore has a somewhat larger diameter than the terminal portion 37.

From the side of the housing tube 3, i.e. in a direction away from the opposite housing cover, a housing cap part 42 is placed on the centering portion. The cap part 42 is fixed—if desired in a detachable manner—on the housing cover 5 and 6 and is more particularly carried on the centering portion 24 and it has a terminal face 43, which is axially opposite to and spaced from the inner groove flank 35 and it defines the outer groove flank 36.

The cap part 42 and the housing cover 5 and 7 are therefore two separate components, which are produced separately from each other before they are fitted together. Both parts may be produced without machining and more especially by injection molding without any later fettling by cutting being necessary at the annular groove 28. Accordingly economic manufacture is possible.

While the housing cover 5 and 6 preferably consists of a gals fiber reinforced plastic material, the cap part 42 is more particularly produced using non-reinforced thermoplastic synthetic resin material. Both parts can be manufactured by injection molding.

The annular seal 32 may admittedly be mounted in principle after the assembly of the housing cover 5 and 6 and the cap part 42. However such an assembly is preferred in which prior to mounting of the cap part 42 the seal 32 is axially slipped onto the region, defining the groove floor 33, of the cylindrical terminal portion 37. This offers the advantage that the seal practically does not have to be radially stretched and accordingly the danger of over-loading is diminished during assembly.

In the case of the preferred working example the cap part 42 has an essentially cylindrically configured lateral peripheral wall 44 delimited axially on the one hand by the terminal face 43 constituting the outer groove flank 36 and adjoining at the other axial end a preferably disk-like floor wall 45, which extends in a plane perpendicular to the longitudinal axis 23. To this extent the configuration is like a cap.

The cap part 42 is mounted on the centering portion 24 with the terminal face 43 to the fore, the portion 24 being overlapped radially outward in an axial direction by the lateral peripheral wall 44. The design is more particularly such that the lateral peripheral wall 44 has its inner periphery resting on the outer periphery of the cylindrical terminal portion 37.

Although in principle a design would be possible in which the cap part 42 is screwed on the housing cover 5 and 6 or mounted on it with a plug and twist joint, a design is preferred in which the mounting in place takes place exclusively with a plugging operation in the axial direction as indicated by the arrow 46.

The length of the plugging action is limited by the floor wall 45 engaging the terminal face 38. The floor wall 45 is accordingly placed to the fore of the centering portion 24 in the axial direction abuts the terminal face 38 of the centering portion 24.

The lateral peripheral wall 44 may in its peripheral direction, i.e. around the longitudinal axis 23, be a complete closed ring. For the simplification of assembly it is however preferred to have segments as in the case of the working embodiment. Here the peripheral wall 44 is divided up into several wall segments 48 (which follow each other consecutively in the peripheral direction) by peripherally separated slot-like intermediate spaces 47, which extend from the floor wall 45 and run as far as the terminal face 43.

The wall segments 48 are able to bend elastically in relation to the floor wall 45 in a radial direction. Therefore for the purpose of plugging the cap part 42 on the housing cover 5 and 6 they may be radially deformed. This possibility is employed in the working example to produce a detent connection between the cap part 42 and the housing cover 5 and 6.

Some of the wall segments 48 have a radially inwardly projecting detent projection 52. In the working embodiment several pairs of wall segments 48, arranged adjacent to each other in the peripheral direction, are each provided with such a detent projection 52, a respective wall segment 48 without a detent projection 48 being placed between consecutive pairs of such wall segments 48. In all in the working embodiment the cap part 42 has four pairs of wall segments 48, each with one detent projection 52.

Several, for example four, peripherally distributed slot-like detent wells 53 are formed in the radially outwardly facing peripheral face of the cylindrical terminal portion 37. Each of these detent wells 53 has a length of such a size in the peripheral direction of the terminal portion 37 that it is possible to fit the detent projections 52 of a pair of wall segments 48 in it. Furthermore the distribution of the detent wells 53 corresponds to the distribution of the pairs of wall segments 48 provided with the detent projections 52.

In the fitted condition of the cap part 42 the detent projections 52 of the various pairs of wall segments 48 respectively fit in the detent wells 53 provided therefor. In this case it is possible to speak of snapping into place. Thus the cap part 42 is secured on the centering portion 24 in an axially fixed manner. Since the detent wells 53 only reach into part of the length of the periphery of the terminal portion 37, there is furthermore a means preventing rotation of the cap part 42 in relation to the centering portion 24. The angular position about the longitudinal axis 23 between the cap part 42 and the housing cover 5 and 6 is accordingly set one and for all.

The described detent action is particularly advantageous, although it may be produced in some other way. For instance there is the possibility of producing a catch or detent, in addition or alternatively, between another component of the cap part 42 and the housing cover 5 and 6.

Furthermore there is the possibility of adhesively bonding the cap part 42 to the housing cover 5 and 6 or using some other attachment means. Given a suitable configuration of the housing tube 3, for example in the form of a ledge on the inner periphery, the cap part 42 can also be secured by the housing tube 3 in its position on the housing cover 5 and 6.

For the sake of ensuring simple manufacture it is nevertheless an advantage if a housing tube 3 is employed having a constant inner cross section along its full length. In this case—see the working example—the outer terminal face 54, directed axilly away from the centering portion 42, of the cap part 42—which extends as well past the floor wall 45—is left completely free and uncovered. More particularly no component of the housing tube 3 extend radially in front of this outer terminal face 54.

More especially owing to this feature it is possible to make use of the outer terminal face 54 as an impact face for the drive piston 8. The drive piston 8 may run up against it when it reaches its end of stroke position during its working movement 22. If the cap part 42 consists of a material with a greater tendency to yield than the material of the housing cover 5 and 6, it is accordingly possible to buffer the intensity of the impact. It is possible as well, in a manner which is not separately illustrated, to employ the cap part 42 as support for rubber-elastic buffering material, which during terminal impact of the drive piston 8 will provide a further damping effect.

The two housing covers 5 and 6 have a recess 56, which is centered on the longitudinal axis 23, extending in them which forms a component of the control duct 14 and 15 and is also open toward the adjacent working chamber 17 and 18 along the associated aperture region 16. The front housing cover 5 has its recess 56 extending through it axially and the piston rod 12 fits through it. The recess 56 in the rear housing cover 6 can be in the form of a blind hole since there is no piston rod, see the figure, having to move through it and on the side opposite to the aperture region 16 it is shut off by a floor 57 constituted by the rear housing cover 6.

In order to ensure that the cap part 42 does not obstruct fluid flow through the control duct 14 and 15, its floor wall 45 has an axially extending opening in its central region. The resulting aperture 58 in the floor is directed coaxially in relation to the aperture region 16 and preferably has approximately the same diameter as it.

The pressure medium may accordingly flow through the cap part 42 for acting on the drive piston 8.

In order to provide optimum stability of the cap part 42 on the housing cover 5 and 6 the former preferably has a sleeve-like axial extension 63 which at one end is fixed on the floor wall 45 and extends axially away from it, it terminating at a front terminal face 63 opposite to the floor wall 45. The axial extension 62 runs through the inner aperture region 16 into the recess 56, the cross section of the recess 56 and the outline of the axial extension 62 being so matched that the axial extension 62 is radially supported by the inner peripheral face 64 of the recess 56. Accordingly the cap part 42 is supported over a considerable length athwart the longitudinal axis 23 in relation to the housing cover 5 and 6 and even in the case of a heavy impact of the drive piston 8 does not run skew or alter its alignment in some other way.

The inner space contained by the axial extension 62 directly adjoins the floor aperture 58. At one or more points the wall of the axial extension 62 is apertured in order to permit a fluid connection between its inner space and the outer aperture region 14*a* and 15*a* of the associated control duct 14 and 15, at which the above mentioned fluid lines may be connected.

The cap parts 42 assigned to the two housing covers 5 and 6 differ as regards the length and configuration of their axial extensions 62. In both cases the sleeve-like axial extensions 62 are however open at both terminal sides, the front terminal face 63 defining a front opening 65 axially opposite to the floor aperture 58.

Figure 11:
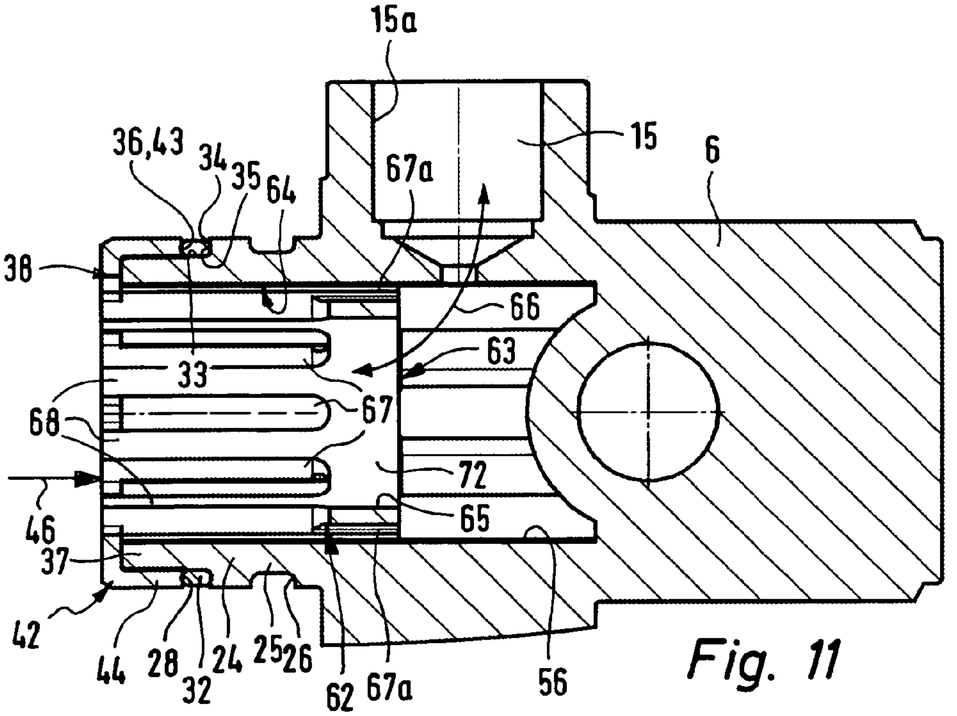
FIG. 11 shows the region XI surrounded by in chained lines in a separate view as a longitudinal section.
Figure 12:
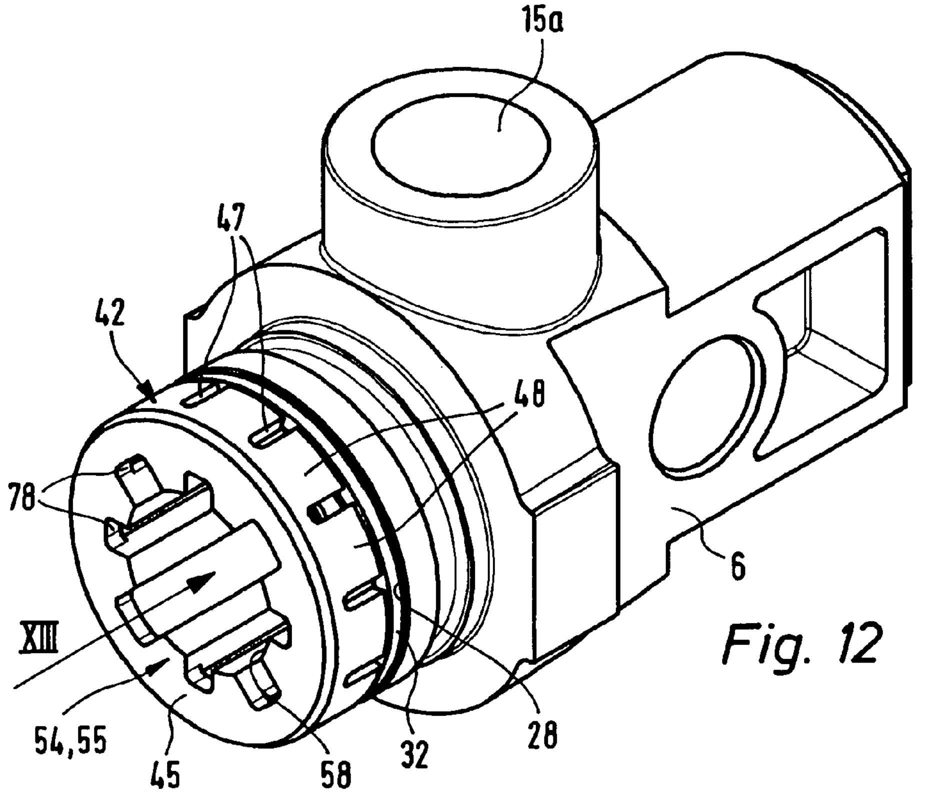
FIG. 12 shows the rear housing cover in accordance with FIG. 11 in a perspective view from the rear.
Figure 13:
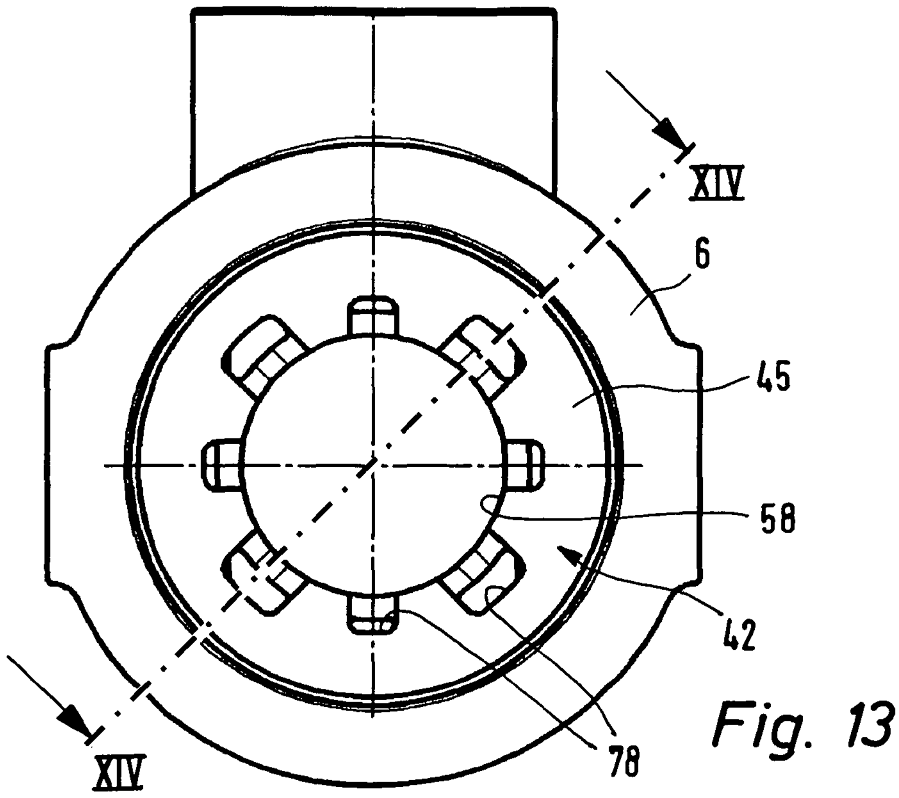
FIG. 13 is an end-on view of the rear housing cover looking in the direction of the arrow XIII in FIG. 12.
Figure 14:
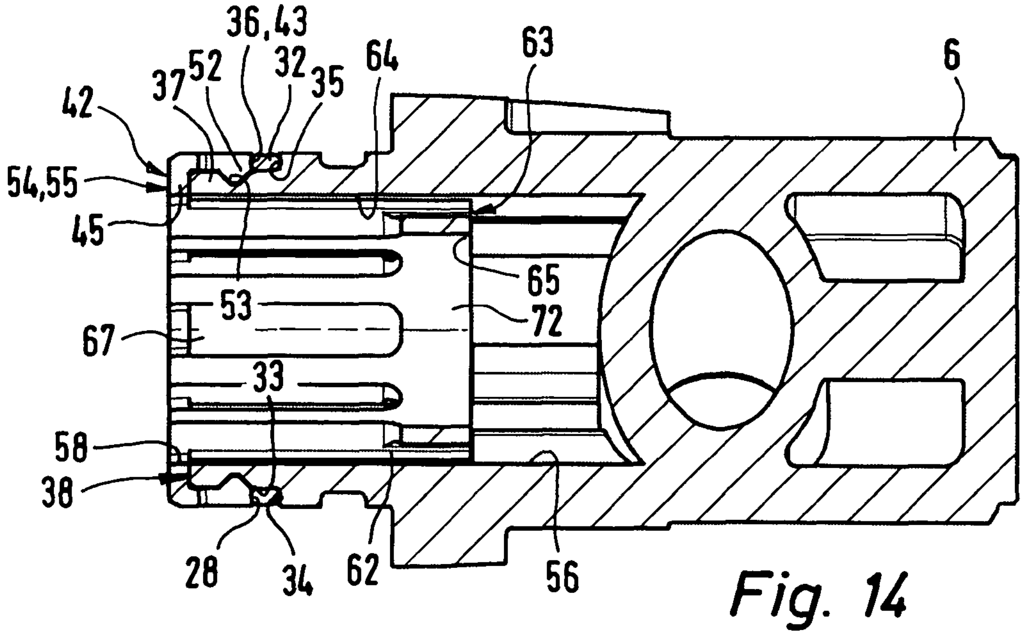
FIG. 14 represents a further longitudinal section through the rear housing cover taken on the section line XIV-XIV in a plane of section rotated through 45 degree as related to the plane in FIG. 11.

In the case of the rear housing cover 6 the sleeve-like axial extension 62 ends short of the inlet opening of the outer aperture region 15*a* into the recess 56 (see FIG. 11). The pressure medium may therefore, as indicated by the double arrow 66, flow through the front opening 65 between the outer aperture region 15*a* and the adjoining working chamber 18.

In the case of the housing cover 5 the front opening 65 is at least substantially shut off by the piston rod 12 extending through the axial extension 62 and therefore is not available for fluid passage. In this case however the peripheral wall of the axial extension 62, at points on the periphery, is provided with several radial apertures 67 of slot-like configuration, which provide a fluid connection between the inner space of the axial extension 62 and the associated outer aperture region 14*a*.

The slot-like apertures 67 are constituted by the intermediate spaces between the several connecting ribs 68, which extend axially between the floor aperture 58 and an annular portion 72, placed coaxially in front of the floor wall 58 (and spaced from it) of the axial extension 62. Preferably they are respectively integrally joined with the floor wall 45 and the annular portion 72. They are distributed in the peripheral direction of the axial extension 62, more especially evenly.

The connecting ribs 68 may run axially over the full annular portion 72. Adjacent to the annular portion 72 the intermediate spaces between the connecting ribs (which are adjacent in the peripheral direction) constitute groove-like recesses 67*a*, which respectively adjoin one of the slot-like apertures 67.

To provide for a simplification of the manufacture the cap parts 42 for the two housing covers 5 and 6 are preferably conceived to be identical. Accordingly the cap part 62 for the rear housing cover 6 possesses the configuration just explained with connecting ribs 68 and with the annular portion 72 borne thereby. In the case of both cap parts 42 the front terminal face of the axial extension 62 is located on the annular portion 72.

The groove-like recesses 67*a* permit, in the case of the cap part 42 of the rear housing cover 6, in addition to the fluid flow 66 also a peripheral fluid flow through the region, which lies radially between the annular portion 72 and the input peripheral face of the recess 56, so that the pressure medium may be transferred between the outer aperture region 15*a* and the slot-like apertures 64.

Furthermore the annular portion 72 has essentially only a stabilizing function in the case of the cap part 42 of the rear housing cover 6. The case is different with the cap part 42 of the front housing cover 5. Here the annular suction 72 constitutes a plain bearing 73 surrounding the piston rod 12 coaxially for linear guidance of the piston rod 12.

Preferably the annular portion defining the plain bearing 73 is provided with several longitudinal grooves 74 (distributed in the peripheral direction) on its inner periphery, by which the inner peripheral face of the annular portion 72 is divided up into several strip-like plain bearing faces 75 in the peripheral direction. Accordingly the plain bearing 73 does not contact the full periphery of the piston rod 12 but only at separate peripheral portions which are consecutive to each other.

The segmentation of the plain bearing 73 to provide separate plain bearing sides 75 facilitates, among other things, the manufacture of the preferably generally integral cap part 42. In the case of production by injection molding there is a particularly high degree of dimensional accuracy.

In addition to its function for defining the flank 36 of the annular groove 28 and forming a plain bearing 73 the cap part 42 of the front housing cover 5 may also have a third principal function, which resides in axially securing an annular stripper 76 coaxially surrounding the piston rod 12 in the recess 56 in the front housing cover 5

The stripper 76 is placed in front of the front terminal face 63 of the axial extension 62 and trapped axially between the latter and an annular ledge or step 77 on the front outlet part of the recess 56. Assembly is performed in such a manner that firstly the stripper 76 and then the cap part 42 are plugged in past the aperture region 16, the cap part being able to push in the stripper 76 as far as the terminal position on the ledge 77.

The stripper 76 contacts the outer periphery of the piston rod 12 and strips off dirt, when the piston rod 12 travels into the drive housing 2.

In the case of the cap part 42 it is a question preferably of a generally integral component.

The inner periphery of the axial extension 62 is preferably stepped in the transitional region 79 merging with the annular portion 72 so that the cross section, surrounded by the annular portion 72, is smaller than the part of the length following it and extending as far as the aperture 58 in the floor. In conjunction with a piston rod 12 it is accordingly possible to ensure that except from the plain bearing faces 75 no other components of the cap part 42 touch the piston rod 12.

At the edge part of the floor wall 45 surrounding the floor aperture 58 the slot-like apertures 67 appear as recesses 67 distributed over the periphery. They enlarge the flow cross section for the pressure medium for operation of the linear drive 1.

The invention claimed is:

1. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the cap part has a lateral peripheral wall with which it fits axially over the centering portion radially on the outside thereof, the terminal face of the lateral peripheral wall constituting the outer groove flank.

2. The linear drive in accordance with claim 1, wherein the lateral peripheral wall of the cap part is segmented in the peripheral direction and has several wall segments spaced from each other by intermediate spaces.

3. The linear drive in accordance with claim 2, wherein the wall segments are at least in part elastically flexible in design and may be locked on the centering portion by detent means for securing the cap part in position.

4. The linear drive in accordance with claim 3, wherein at least one wall segment has a radially inwardly extending detent projection, which for locking the cap part may fit into a detent well formed on the outer periphery of the centering portion.

5. The linear drive in accordance with claim 3, wherein the detent engagement leads to a twist-proof fixing of the cap part in relation to the centering portion.

6. The linear drive in accordance with claim 1, wherein the cap part has a floor wall axially preceding the terminal face of the centering portion.

7. The linear drive in accordance with claim 6, wherein the floor wall rests against the terminal face of the centering portion.

8. The linear drive in accordance with claim 6, wherein the terminal face of the floor wall of the cap part directed axially away from the centering portion, constitutes a buffer face for a drive piston, which is linearly slideably arranged in the drive housing, on arriving at an end position.

9. The linear drive in accordance with claim 6, wherein the floor wall is perforated axially in the central region.

10. The linear drive in accordance with claim 6, wherein the cap part has a sleeve-like axial extension which, starting at the floor wall, extends into a recess, open toward the terminal face of the centering portion, in the housing cover and is supported by the inner peripheral face of the recess radially.

11. The linear drive in accordance with claim 1, wherein the cap part is secured in position on the housing cover by detent action.

12. The linear drive in accordance with claim 1, wherein the cap part is axially plugged onto the housing cover.

13. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the cap part has a floor wall axially preceding the terminal face of the centering portion, and wherein the cap part has a sleeve-like axial extension which, starting at the floor wall, extends into a recess, open toward the terminal face of the centering portion, in the housing cover and is supported by the inner peripheral face of the recess radially, and wherein the sleeve-like axial extension has, axially spaced from the floor wall, a coaxial annular portion, which is joined by several axially extending connecting ribs with the floor wall, said connecting ribs being distributed in the peripheral direction of the axial extension.

14. The linear drive in accordance with claim 13, wherein the annular portion constitutes a plain bearing for a piston rod of the linear drive extending through it coaxially.

15. The linear drive in accordance with claim 14, wherein the inner peripheral face of the annular portion is divided up by several longitudinal grooves distributed in the peripheral direction into a plurality of plain bearing faces spaced from each other in the peripheral direction.

16. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the cap part has a floor wall axially preceding the terminal face of the centering portion, and wherein the cap part has a sleeve-like axial extension which, starting at the floor wall, extends into a recess, open toward the terminal face of the centering portion, in the housing cover and is supported by the inner peripheral face of the recess radially, and wherein the sleeve-like axial extension constitutes a plain bearing for a piston rod of the linear drive extending through it coaxially.

17. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the cap part has a floor wall axially preceding the terminal face of the centering portion, and wherein the cap part has a sleeve-like axial extension which, starting at the floor wall, extends into a recess, open toward the terminal face of the centering portion, in the housing cover and is supported by the inner peripheral face of the recess radially, and wherein the front terminal face, lying in the recess of the housing cover of the sleeve-like axial extension, constitutes a support face for a coaxially preceding annular stripper for a piston rod, said annular stripper being held on the side opposite to the support face by the housing cover.

18. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the housing tube fits over the cap part without axially supporting same on the terminal side axially opposite to the centering portion.

19. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the cap part is an integral plastic part and consists of a non-reinforced thermoplastic synthetic resin material.

20. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the housing cover consists of a fiber-reinforced plastic material.

21. A fluid power linear drive comprising a drive housing having a housing tube and terminating walls terminally arranged thereon, at least one terminating wall being in the form of a housing cover separate from the housing tube and having a centering portion fitting into the housing tube, said centering portion having on its outer periphery an annular groove with two axially opposite groove flanks and in such annular groove at least one annular seal is received for cooperation with the inner face of the housing tube fitted over it, wherein the outer axial groove flank, arranged on the side of the housing tube, of the annular groove is formed by a terminal face of a cap part mounted from the side of the housing tube coaxially on the centering portion and secured on the housing cover, wherein the two terminating walls are in the form of housing covers each provided with a cap part.

* * * * *